(12) United States Patent
Alloggio et al.

(10) Patent No.: US 8,061,933 B2
(45) Date of Patent: Nov. 22, 2011

(54) LAY RAMP ACTUATING DEVICE AND METHOD FOR AN UNDERWATER-PIPELINE LAYING VESSEL, AND RELATIVE PIPELINE LAYING VESSEL

(75) Inventors: Giovanni Carlo Alloggio, Sanfre (IT); Christian Cocca, Cinisello Balsamo (IT); Teresio Signaroldi, Sordio (IT)

(73) Assignee: Saipem S.p.A., San Donato Milanese (IT)

( * ) Notice: Subject to any disclaimer, the term of this patent is extended or adjusted under 35 U.S.C. 154(b) by 65 days.

(21) Appl. No.: 12/451,885

(22) PCT Filed: May 6, 2008

(86) PCT No.: PCT/IB2008/001440
§ 371 (c)(1), (2), (4) Date: Mar. 9, 2010

(87) PCT Pub. No.: WO2008/149210
PCT Pub. Date: Dec. 11, 2008

(65) Prior Publication Data
US 2010/0189513 A1    Jul. 29, 2010

(30) Foreign Application Priority Data
Jun. 6, 2007   (IT) .............................. MI2007A1158

(51) Int. Cl.
*B63B 35/03* (2006.01)
*F16L 1/225* (2006.01)

(52) U.S. Cl. ..................................... 405/166; 405/168.1
(58) Field of Classification Search .................. 405/158, 405/166, 168.1, 168.3, 168.4, 169, 170, 171, 405/172
See application file for complete search history.

(56) References Cited

U.S. PATENT DOCUMENTS

| | | | |
|---|---|---|---|
| 3,585,806 A * | 6/1971 | Lawrence | 405/166 |
| 4,257,718 A * | 3/1981 | Rosa et al. | 405/166 |
| 5,533,834 A * | 7/1996 | Recalde | 405/166 |
| 6,056,478 A * | 5/2000 | Martin et al. | 405/168.3 |
| 6,588,981 B2 * | 7/2003 | Willis et al. | 405/166 |
| 2010/0086360 A1 * | 4/2010 | Signaroldi | 405/166 |

FOREIGN PATENT DOCUMENTS

| | | | |
|---|---|---|---|
| EP | 1063163 | * | 12/2000 |
| WO | WO 2008086938 A1 | * | 7/2008 |
| WO | WO 2009087559 A1 | * | 7/2009 |

* cited by examiner

*Primary Examiner* — Frederic L Lagman
(74) *Attorney, Agent, or Firm* — Davidson Berquist Jackson & Gowdey, LLP

(57) ABSTRACT

An actuating device (23) for a lay ramp (6) of a vessel (1) for laying underwater pipelines "(2) has a runner (28), and a carriage (29) connected to the lay ramp (6) and which runs along the runner (28) to lift and lower the lay ramp (6); the runner (28) being defined by a first, a second, and a third portion (31, 32, 33), of which the first and third portion (31, 33) are out of line with respect to each other, and the second portion (32) is mounted on a movable assembly (37) to selectively align the second portion (32) with the first and third portion (31, 33).

26 Claims, 6 Drawing Sheets

LAY RAMP ACTUATING DEVICE AND METHOD FOR AN UNDERWATER-PIPELINE LAYING VESSEL, AND RELATIVE PIPELINE LAYING VESSEL

TECHNICAL FIELD

The present invention relates to a lay ramp actuating device for an underwater-pipeline laying vessel.

More specifically, the present invention relates to an actuating device comprising a runner; and a carriage connected to the lay ramp and which runs along the runner to lift and lower the lay ramp.

BACKGROUND ART

A pipeline laying vessel is a floating unit comprising a production line for producing the underwater pipeline, and equipped at the stern with a lay ramp, which forms an extension of the production line and provides for laying the underwater pipeline on the sea bed. Though the following description refers specifically to laying pipelines in the sea, the present invention also applies to any stretch of water large and deep enough to accommodate a pipeline laying vessel.

At present, underwater pipelines are produced and laid using two main methods, depending on the depth of the sea bed.

A first method is to produce the pipeline on a vertical production line, and lay the pipeline vertically, so that the portion of the pipeline extending between the vessel and the sea bed assumes a "J" shape. This method is particularly suitable for laying deep-sea underwater pipelines.

A second method is to produce the pipeline on a substantially horizontal production line, and lay the pipeline using a lay ramp, which, in the work configuration, guides and supports the pipeline along an arc-shaped path having a first portion above sea level, and a second portion below sea level. Using this method, the pipeline being laid assumes an "S" shape between the vessel and sea bed, and various types of vessels can be employed, such as pontoons, barges, semisubmersible and single-hull vessels. Pontoons and barges are the underwater-pipeline laying vessels most commonly used in the past; semisubmersible vessels are particularly suitable for laying underwater pipelines in bad weather (rough sea); and single-hull vessels have the advantage of being fast, have ample pipe storage space, and can accommodate relatively long production lines with a high output rate.

Laying underwater pipelines using the second method calls for relatively good weather conditions, so much so that, in rough-sea conditions, laying is suspended: the pipeline being laid is left on the sea bed, possibly attached to a salvage cable; and the lay ramp is set as high as possible above sea level in a so-called "survival configuration".

The lay ramp must normally be movable into various work configurations, depending on the depth of the sea bed and the characteristics of the pipeline, and into an in-transit configuration allowing unobstructed movement of the vessel.

Accordingly, the lay ramp is connected to an actuating device for altering its configuration and its position with respect to the vessel.

One particular type of lay ramp, designed to assume various configurations and positions, is described in the Applicant's Patent U.S. Pat. No. 4,257,718, which describes a semisubmersible underwater-pipeline laying vessel equipped with a lay ramp comprising an inside ramp hinged to the vessel, and an outside ramp hinged to the inside ramp; and an actuating assembly comprising a first and second actuating device for operating the inside ramp and outside ramp respectively.

Each actuating device comprises two runners; and two carriages which run along respective runners and are connected by rods to the respective inside/outside ramp to rotate the respective inside/outside ramp about a hinge axis. The runners of the inside-ramp actuating device are fixed substantially vertically to the vessel; and the runners of the actuating device of the outside ramp hinged to the vessel are fixed substantially horizontally to the deck of the vessel.

Though highly efficient, the above actuating device has the drawback of requiring relatively long runners to achieve an extensive range between the extreme positions of the lay ramp.

The longer the runners, however, the greater the problems caused on board the vessel, such as obstructing other onboard equipment, and major structural alterations to the vessel, the high cost of which may even exclude the possibility of employing certain types of vessels structurally unfit to accommodate long runners.

DISCLOSURE OF INVENTION

It is an object of the present invention to provide a lay ramp actuating device featuring runners, but without impairing the range of the lay ramp, and designed to eliminate the drawbacks of the known art.

According to the present invention, there is provided an actuating device for a lay ramp of a vessel for laying underwater pipelines; the actuating device comprising a runner, and a carriage connected to the lay ramp and which runs along the runner to lift and lower the lay ramp; the actuating device being characterized in that the runner comprises a first, a second, and a third portion, of which the first and third portion are out of line with respect to each other, and the second portion is mounted on a movable assembly to selectively align the second portion with the first and third portion.

According to the present invention, a runner need not necessarily extend along a straight path, but may be divided into various portions, and the path of the carriage adapted to the structure and space available on the vessel.

The present invention also relates to a lay ramp actuating method.

According to the present invention, there is provided a lay ramp actuating method for an underwater-pipeline laying vessel, the actuating method comprising the step of selectively lifting and lowering a lay ramp with respect to the vessel by means of an actuating device comprising a runner, and a carriage connected to the lay ramp and which runs along the runner; the method being characterized by running the carriage along a first, a second, and a third portion, of which the first and the third portion are out of line with respect to each other; and selectively aligning the second portion with the first and third portion by means of a movable assembly.

The present invention also relates to a pipeline laying vessel.

According to the present invention, there is provided an underwater-pipeline laying vessel equipped with a lay ramp, and with an actuating device for lifting and lowering the lay ramp, as claimed in any one of Claims 1 to 15.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
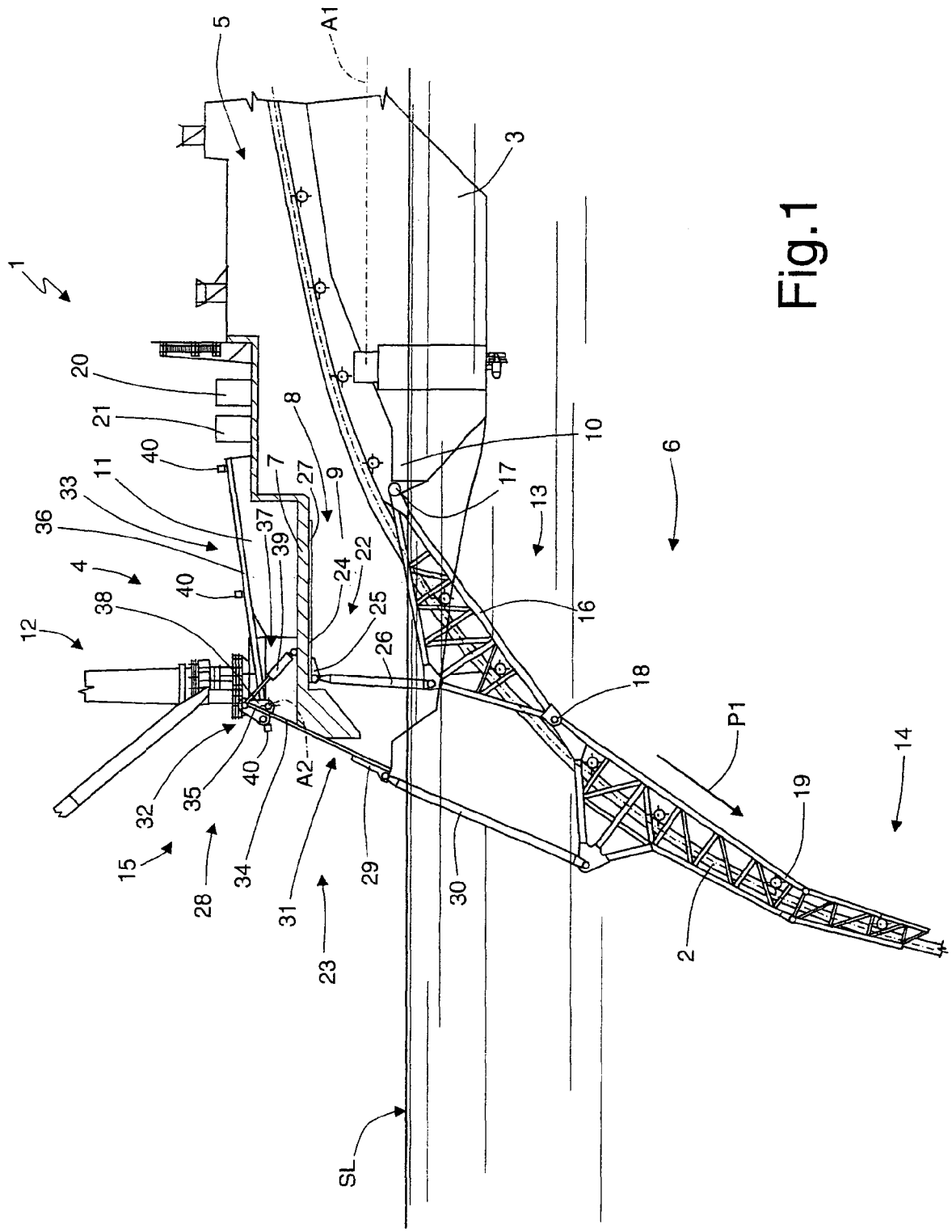
FIGS. 1 to 4 show partly sectioned, schematic side views, with parts removed for clarity, of a pipeline laying vessel equipped with a lay ramp and an actuating device in accordance with the present invention, and in which the lay ramp and the actuating device are shown in various configurations with respect to the vessel.

Number 1 in FIG. 1 indicates a pipeline laying vessel for laying an underwater pipeline 2 in relatively deep water, the level of which is indicated SL. In the example shown, vessel 1 is a single-hull ship extending along a longitudinal axis A1 and comprising a hull 3; an aftercastle 4; and a production line 5 for producing underwater pipeline 2 by joining pipes not shown in the drawings.

Vessel 1 is equipped with a lay ramp 6, which defines an extension of production line 5, and, in the FIG. 1 configuration, guides and supports underwater pipeline 2 along an arc-shaped path P1 having a first portion above sea level SL, and a second portion below sea level SL.

Aftercastle 4 of vessel 1 has an upper deck 7 defining the top of a well 8, which is bounded laterally by two walls 9 partly immersed at the aft end, and is bounded by a lower deck 10 supporting production line 5.

Two lateral walls 11 (only one shown in FIG. 1) and a crane 12 extend above upper deck 7.

Lay ramp 6 is housed at least partly in well 8, is hinged to vessel 1, and, in the example shown, comprises an inside ramp 13 hinged to lower deck 10; and an outside ramp 14 hinged to inside ramp 13.

Vessel 1 is equipped with an actuating assembly 15 for supporting and rotating inside ramp 13 with respect to vessel 1; supporting and rotating outside ramp 14 with respect to inside ramp 13; and locking inside ramp 13 and outside ramp 14 in a number of configurations and positions.

More specifically, inside ramp 13 comprises a substantially rigid trestle structure 16, which has a first end hinged to lower deck 10 by a hinge 17 with an axis perpendicular to longitudinal axis A1 of vessel 1 and substantially horizontal (in calm-sea conditions); and a second end hinged to outside ramp 14 by a hinge 18 with an axis parallel to the axis of hinge 17. Outside ramp 14 comprises a substantially rigid trestle structure 19 similar to trestle structure 16 of inside ramp 13 and hinged to inside ramp 13 by hinge 18.

Actuating assembly 15 comprises a control unit 20; a hydraulic unit 21 for producing and distributing pressurized fluid; an actuating device 22 for operating inside ramp 13; and an actuating device 23 for operating outside ramp 14.

Actuating device 22 of inside ramp 13 comprises two opposite, parallel runners 24; two carriages 25 movable along respective runners 24; and two rods 26, each hinged to a respective carriage 25 and to trestle structure 16 of inside ramp 13.

Only one runner 24, one carriage 25, and one rod 26 are shown in FIGS. 1 to 4, it being understood that the runner 24, carriage 25, and rod 26 not shown are specularly symmetrical, with reference to a vertical plane, with the runner 24, carriage 25, and rod 26 shown in FIGS. 1 to 4.

Runners 24 are defined by straight rails 27 fixed to upper deck 7, and carriages 25 are powered by known hydraulic jacks (not shown) connected to hydraulic unit 21 and positively engaging a respective rail 27.

Actuating device 23 of outside ramp 14 comprises two opposite, parallel runners 28; two carriages 29 movable along respective runners 28; and two rods 30, each hinged to a respective carriage 29 and to trellis structure 19 of outside ramp 14.

Only one runner 28, one carriage 29, and one rod 30 are shown in FIGS. 1 to 4, it being understood that the runner 28, carriage 29, and rod 30 not shown are specularly symmetrical, with reference to a vertical plane, with the runner 28, carriage 29, and rod 30 shown in FIGS. 1 to 4. In the example shown, rods 30 converge towards outside ram 14, as shown more clearly in FIG. 5.

Figure 5:
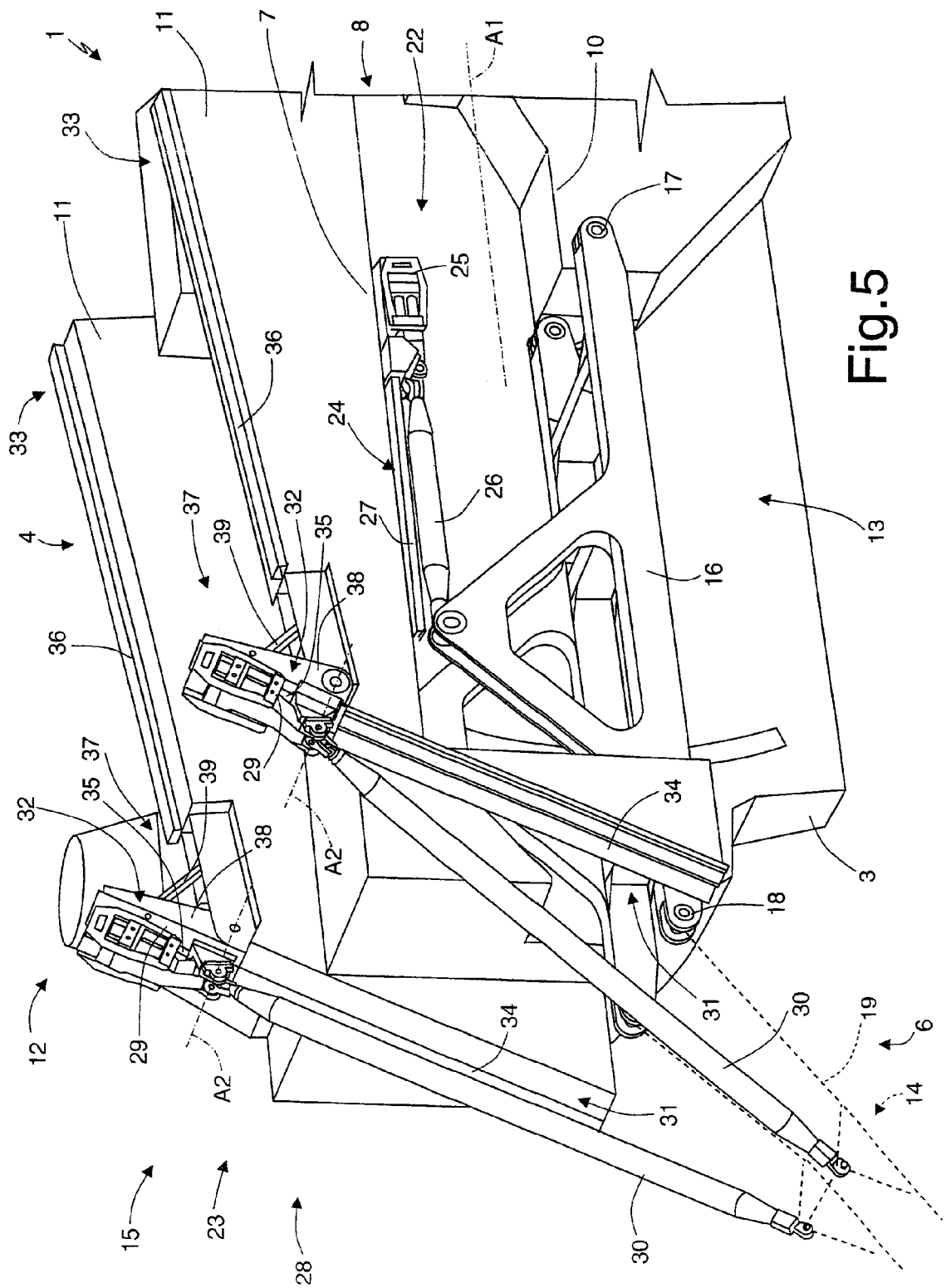
FIG. 5 shows a larger-scale, partly sectioned view in perspective, with parts removed for clarity, of the FIG. 2 vessel.

With reference to FIG. 5, each runner 28 comprises three portions 31, 32, 33, of which portions 31 and 33 are positioned crosswise to each other, and portion 32 is located between, and is movable selectively into alignment with, portions 31 and 33. Portion 31 is defined by a rail 34 which extends from the level of lower deck 10 to a point above upper deck 7 and is slightly less than vertical; portion 32 is defined by a rail 35 located above upper deck 7 and adjustable about an axis A2; and portion 33 is defined by a rail 36 fixed to a respective lateral wall 11, above upper deck 7, and sloping slightly with respect to the horizontal.

In the FIGS. 1 to 5 example, portions 31, 32, 33 are straight, but, in an embodiment not shown, may be curved, with a curvature allowing adequate engagement by carriages 29.

In FIGS. 1 to 5, portions 31, 32, 33 of each runner 28 lie in the same plane, and axis A2 of rotation of rail 35 is perpendicular to the plane of portions 31, 32, 33. In a variation not shown in FIGS. 1 to 5, the portions of the runner do not lie in the same plane, and the intermediate portion of the runner is mounted to rotate about at least two axes of rotation into alignment with the other portions of the runner.

With reference to FIG. 5, rail 35 of the movable portion 32 is fitted to a movable assembly 37 comprising an arm 38 hinged to a respective lateral wall 11 about axis A2; and a hydraulic cylinder 39 hinged at the ends to upper deck 7 and arm 38.

Each carriage 29 is powered by known hydraulic jacks (not shown) connected to hydraulic unit 21 and positively engaging respective runner 28.

With reference to FIGS. 1 to 4, proximity sensors 40 are located along runner 28 and connected to control unit 20 to determine the position of carriage 29 along runner 28 and alignment of portion 32 with portion 31 or portion 33. The location of proximity sensors 40 in FIGS. 1 to 4 is purely indicative, it being understood that the number and type of sensors may be other than as shown.

FIG. 1 shows lay ramp 6 in a work position engaged by an underwater pipeline 2 being laid, and both inside ramp 13 and outside ramp 14 are in the lowered position. In rough-sea conditions, underwater pipeline 2 is released, and lay ramp 6 is raised by actuating assembly 15 as follows: control unit 20 operates hydraulic unit 21 to coordinate carriages 25, carriages 29, and movable assemblies 37 at the lifting stage and prevent interference or collision; for which purpose, control unit 20 receives signals from proximity sensors 40 indicating the instantaneous positions of carriages 25, carriages 29, and movable assemblies 37.

Each of carriages 25 and 29 is moved in steps along respective runners 24 and 28 by a mechanism (the hydraulic jack mechanism for moving carriages 25 and 29 along runners 24 and 28 is known as a jacking system).

When raising lay ramp 6, control unit 20 determines, by means of proximity sensors 40, that portions 32 are aligned with and positioned contacting portions 31 (that rails 35 are aligned with and positioned contacting respective rails 34). If alignment and contact are not confirmed, control unit 20 aligns portions 32 (rails 35) with and contacting respective portions 31 (rails 34) by rotating movable assemblies 37 until alignment and contact are confirmed.

In the embodiment of movable assemblies 37 shown in FIGS. 1 to 4 and in more detail in FIG. 5, alignment coincides with contact. In the following description, therefore, two aligned portions are also assumed contacting each other.

Figure 2:
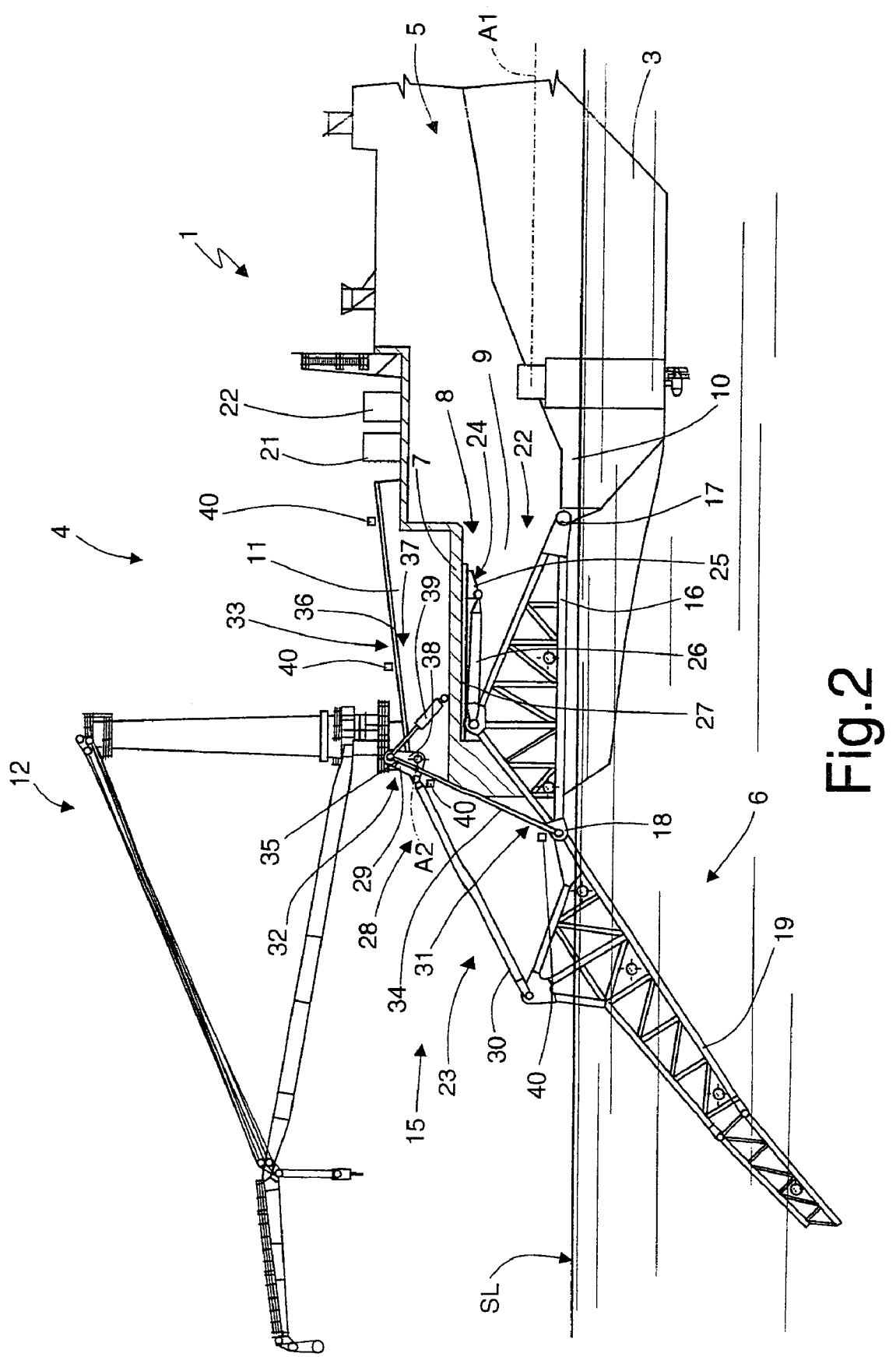
Figure 3:
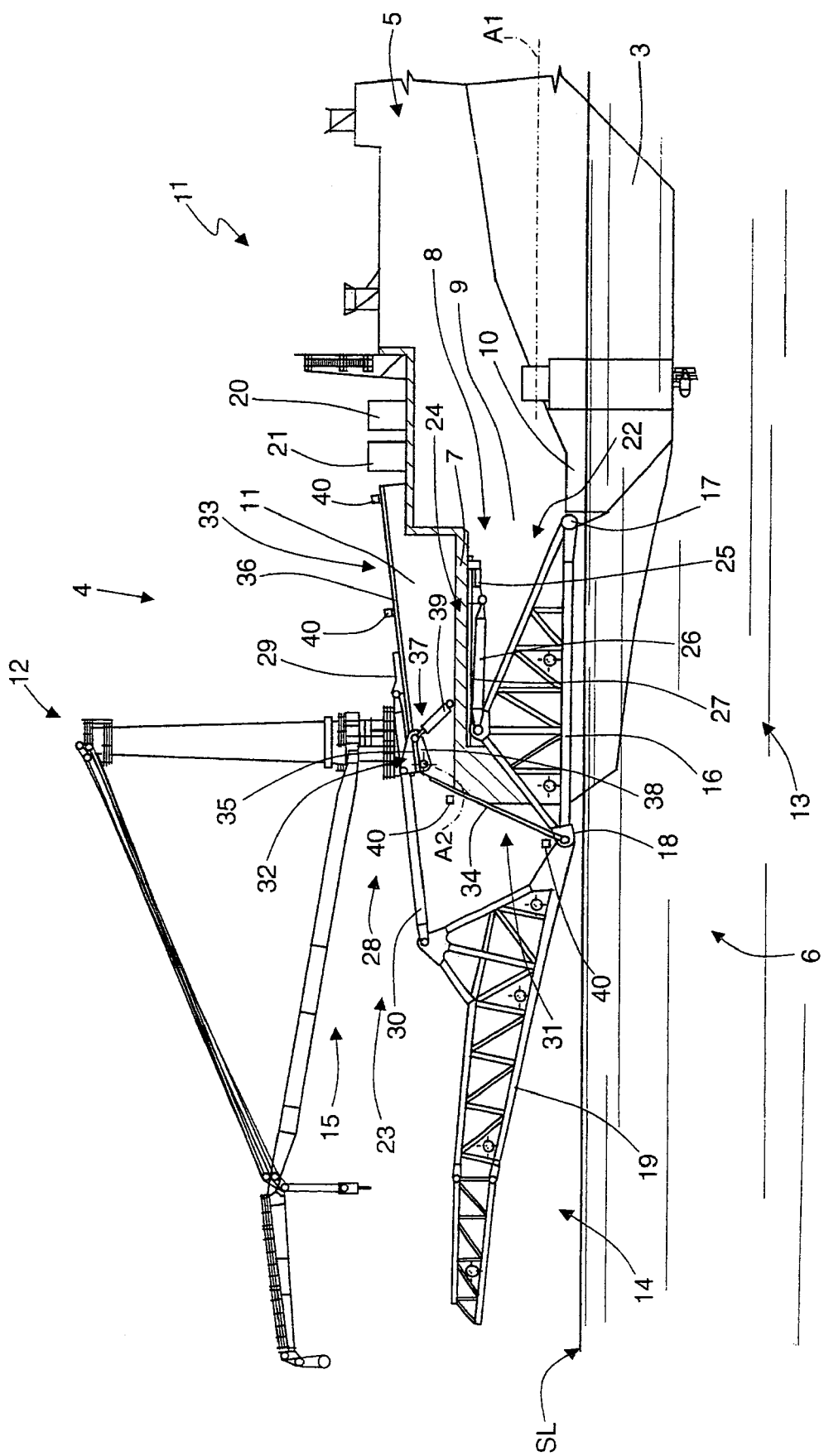
Figure 4:
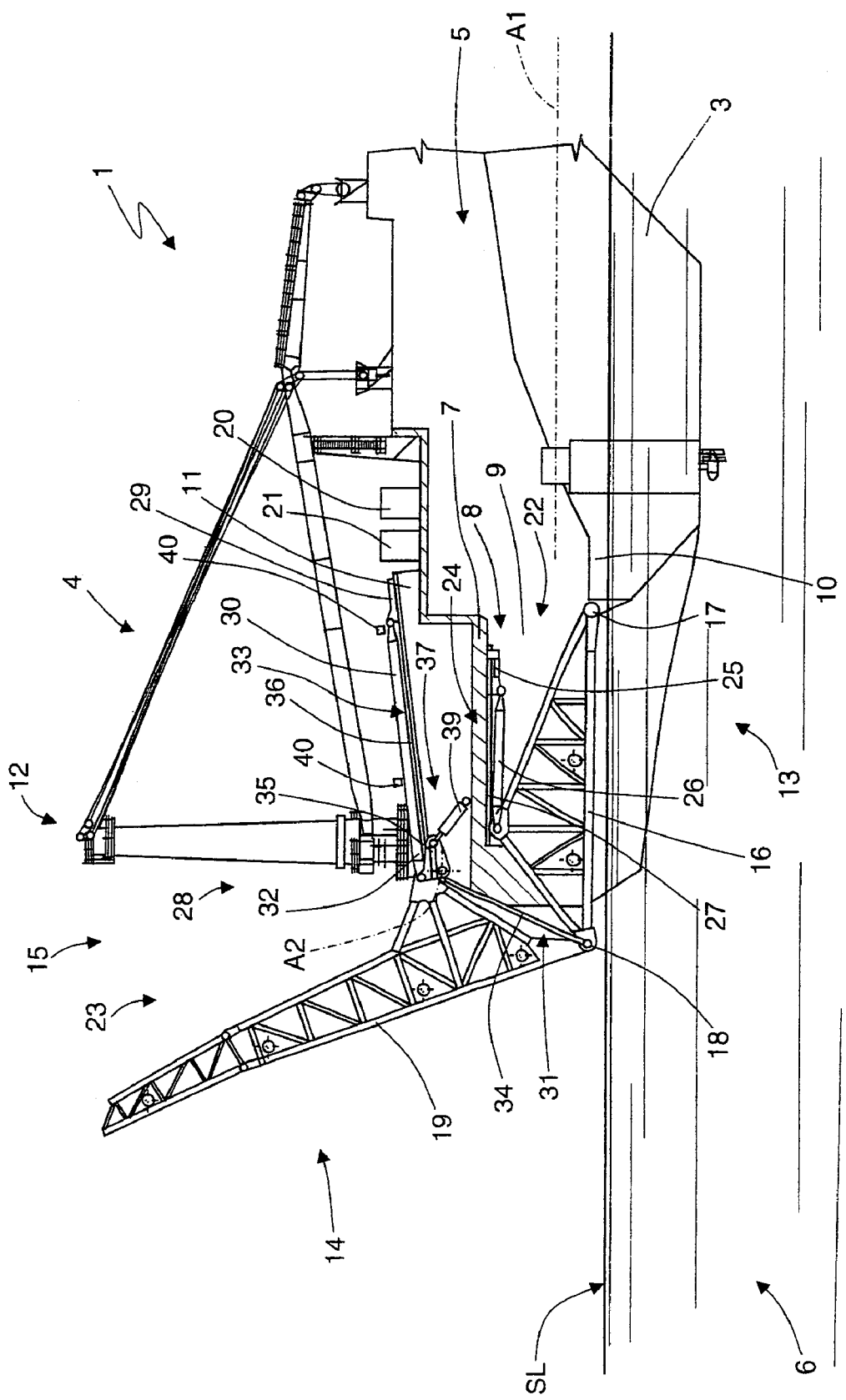

Next, carriages 29 are moved from portions 31 to portions 32 (from rails 34 to respective rails 35). Upon proximity sensors 40 detecting carriages 29 along portions 32 (respective rails 35) (FIG. 2), control unit 20 activates hydraulic cylinders 39 to rotate arms 38 and align portions 32 with portions 33 (rails 35 with respective rails 36). Once alignment is completed, carriages 29 move up along portions 33 (respective rails 36), as shown in FIG. 3, into the fully raised position corresponding to the safety position of lay ramp 6 shown in FIG. 4.

To lower lay ramp 6, control unit 20 determines, by means of proximity sensors 40, that portions 32 are aligned with portions 33 (that rails 35 are aligned with respective rails 36), and, if alignment is not confirmed, rotates movable assemblies 37 to align portions 32 with portions 33 (rails 35 with respective rails 36). Next, carriages 29 are moved from portions 33 to portions 32 (from rails 36 to respective rails 35). Upon proximity sensors 40 detecting carriages 29 along portions 32 (respective rails 35), control unit 20 activates hydraulic cylinders 39 to rotate arms 38 and align portions 32 with portions 31 (rails 35 with respective rails 34) as shown in FIG. 2. Once alignment is completed, carriages 29 move down along portions 31 (respective rails 34) into the fully lowered position shown in FIG. 1.

Figure 6:
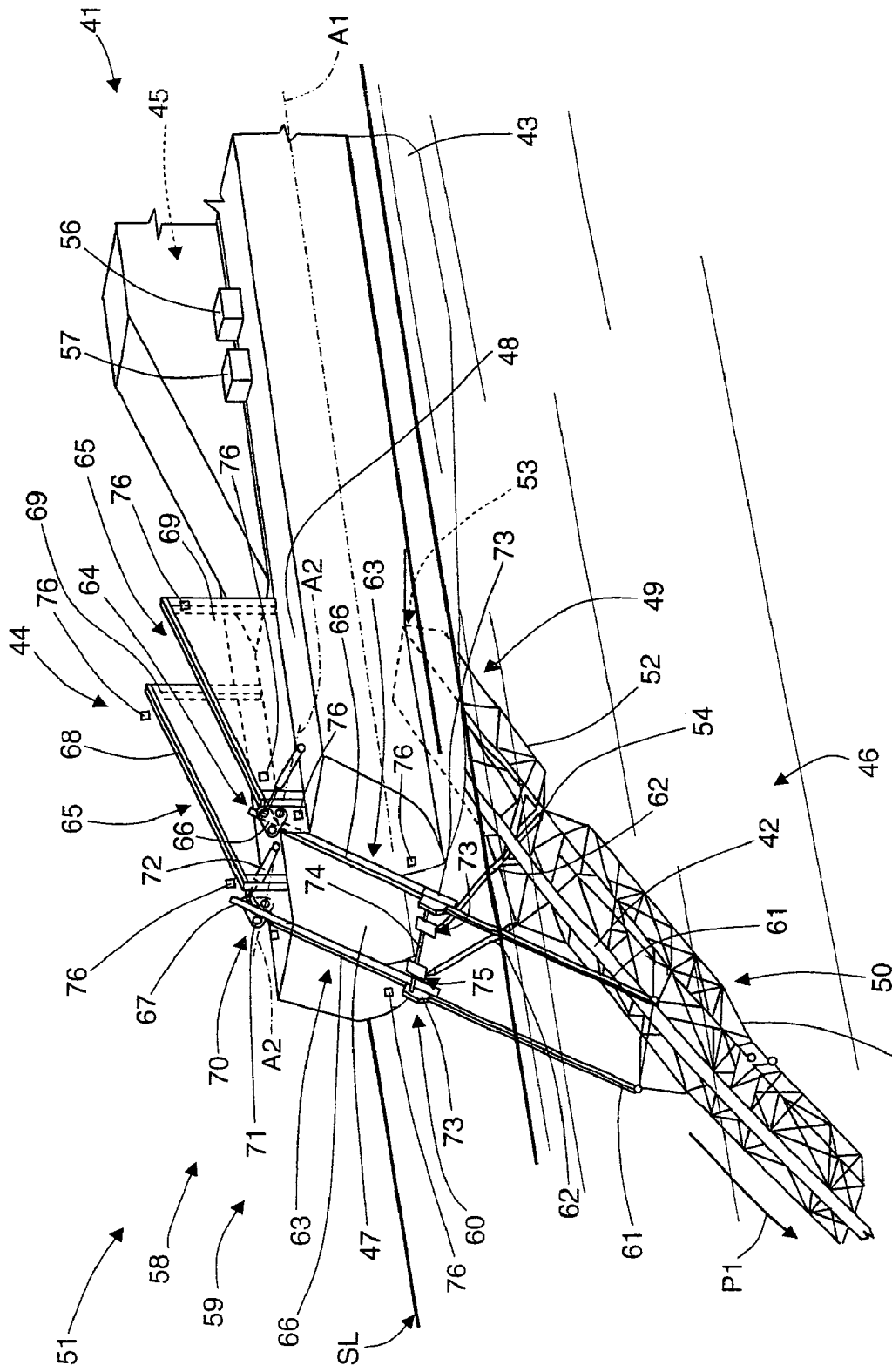
FIG. 6 shows a schematic view in perspective, with parts removed for clarity, of a pipeline laying vessel equipped with a lay ramp and an actuating device in accordance with an alternative embodiment of the present invention.

Number 41 in FIG. 6 indicates a pipeline laying vessel for laying an underwater pipeline 42 in relatively deep water, the level of which is indicated SL. In the example shown, vessel 41 is a single-hull ship extending along a longitudinal axis A1 and comprising a hull 43; an aftercastle 44; and a production line 45 for producing underwater pipeline 42 by joining pipes not shown in the drawings.

Vessel 41 is equipped with a lay ramp 46, which defines an extension of production line 45, and, in the FIG. 6 configuration, guides and supports underwater pipeline 42 along an arc-shaped path P1 having a first portion above sea level SL, and a second portion below sea level SL.

Aftercastle 44 of vessel 41 has an aft deck 48, in which is formed a well bounded by two parallel opposite walls 47 (only one shown in FIG. 6).

Lay ramp 46 is fitted to aftercastle 44, is housed at least partly inside the well, between walls 47, and comprises an inside ramp 49 hinged to vessel 41; an outside ramp 50 hinged to inside ramp 49; and an actuating assembly 51 for supporting and rotating inside ramp 49 with respect to vessel 41, supporting and rotating outside ramp 50 with respect to inside ramp 49, and locking inside ramp 49 and outside ramp 50 in a number of configurations and positions.

More specifically, inside ramp 49 comprises a substantially rigid trestle structure 52, which has a first end hinged to wall 47 by a hinge 53 with an axis perpendicular to longitudinal axis A1 of vessel 41 and substantially horizontal (in calm-sea conditions); and a second end hinged to outside ramp 50 by a hinge 54 with an axis parallel to the axis of hinge 53. Outside ramp 50 comprises a substantially rigid trestle structure 55 similar to trestle structure 52 of inside ramp 49 and hinged to inside ramp 49 by hinge 54.

Actuating assembly 51 comprises a control unit 56; a hydraulic unit 57; and an actuating device 58 for lifting and lowering both inside ramp 49 and outside ramp 50.

Actuating device 58 comprises two opposite runners 59; a carriage 60 engaging both runners 59; two connecting rods 61 hinged to carriage 60 and to outside ramp 50; and two rods 62 hinged to inside ramp 49 and engaging carriage 60.

Each runner 59 comprises a first, second, and third portion 63, 64, 65 arranged successively upwards and defined by respective straight rails 66, 67, 68. Each rail 66 is fixed to a respective wall 47 and substantially vertical; each rail 67 is fitted to a movable assembly 70 to selectively align rail 67 with rail 66 or rail 68; and each rail 68 is located above aft deck 48 and fitted to a wall 69.

Movable assembly 70 comprises an arm 71 hinged to a respective wall 69 about an axis A2; and a hydraulic cylinder 72 hinged at the ends to aft deck 48 and arm 71.

Carriage 60 comprises two gripping heads 73, each of which engages a respective runner 59, and grips and moves along respective runner 59 by means of a jacking system. The two heads 73 are connected by a shaft 74 rotating about its axis and fitted with two further gripping heads 75 which grip rods 62, operate in jacking system mode, and provide for adjusting the operating distance of rods 62 (equal to the distance between carriage 60 and the hinge point between rods 62 and inside ramp 49).

Proximity sensors 76 are located along each runner 59 and connected to control unit 56 to determine the position of carriage 60 along runner 59, and alignment of portion 64 with portion 63 or portion 65.

One pair of runners 59 and one carriage 60 are therefore sufficient to lift inside ramp 49 and outside 50.

Runners 59, more specifically portions 64, are operated in exactly the same way as described for runners 28.

In the FIG. 6 embodiment, portions 63, 64, 65 of each runner 59 are straight and lie in the same plane.

In an alternative embodiment not shown, the portions of the runner are curved, or at least one of the portions of the runner is curved.

In another embodiment not shown, the portions of the runner do not lie in the same plane, and the intermediate portion of the runner rotates about at least two axes into alignment with the other portions of the runner.

Though the present description refers specifically to single-hull ships, the actuating devices according to the present invention are highly versatile, and can be installed on any type of pipeline laying vessel, including semisubmersible vessels.

Alternative embodiments of the present invention, in which the actuating device comprises one runner and one carriage movable along the runner, are also possible, and fall within the protective scope of the accompanying Claims.

The invention claimed is:

1. An actuating device (23; 58) for a lay ramp (6; 46) of a vessel (1; 41) for laying underwater pipelines (2; 42); the actuating device comprising a runner (28; 59), and a carriage (29; 60) connected to the lay ramp (6; 46) and which runs along the runner (28; 59) to lift and lower the lay ramp (6; 46); the actuating device (23; 58) being characterized in that the runner (28; 59) comprises a first, a second, and a third portion (31, 32, 33; 63, 64, 65), of which the first and third portion (31, 33; 63, 65) are out of line with respect to each other, and the second portion (32; 64) is mounted on a movable assembly (37; 70) to selectively align the second portion (32; 64) with the first and third portion (31, 33; 63, 65).

2. The device as claimed in claim 1, wherein the first and third portion (31, 33; 63, 65) are crosswise to each other.

3. The device as claimed in claim 1, wherein the first, second, and third portion (31, 32, 33; 63, 64, 65) are straight.

4. The device as claimed in claim 1, wherein at least one of the first, second, and third portion (31, 32, 33; 63, 64, 65) is curved.

5. The device as claimed in claim 1 wherein the carriage (29; 60) is connected to the lay ramp (6; 46) by a rod (30; 61, 62).

6. The device as claimed in claim 1 wherein the first, second, and third portion (31, 32, 33; 63, 64, 65) of the runner (28; 59) lie in a common plane; and said movable assembly (37; 70) rotates about an axis (A2) perpendicular to the common plane.

7. The device as claimed in claim 6 wherein the carriage (29; 60) positively engages the runner (28; 59), and is powered to move along the runner (28; 59).

8. The device as claimed in claim 7, wherein the carriage (29; 60) is powered by hydraulic actuators.

9. The device as claimed in any one of claims 1 wherein the movable assembly (37; 70) is powered.

10. The device as claimed in claim 9, wherein the movable assembly (37; 70) is powered by a hydraulic actuator (39;: 72).

11. The device as claimed in claim 1 wherein the first, second, and third portion (31, 32, 33; 63, 64, 65) are defined by a first, a second, and a third rail (34, 35, 36; 66, 67, 68) respectively.

12. The device as claimed in claim 1 further including two opposite, specularly symmetrical runners (28); two carriages (29) movable synchronously along the respective runners (28); and two specularly symmetrical rods (30), each connected to a respective carriage (29) and hinged to the lay ramp (6).

13. The device as claimed in claim 1 further including two opposite, parallel, specularly symmetrical runners (59); a carriage (60) engaging and movable along both the runners (59); and two specularly symmetrical rods (61) connected to the carriage (60) and hinged to the lay ramp (46).

14. The device as claimed in claim 13, wherein the lay ramp (46) comprises an inside ramp (49) hinged to the vessel (41), and an outside ramp (50) hinged to the inside ramp (49); the carriage being connected to the inside ramp by rods (62), and to the outside ramp (50) by further rods (61).

15. The device as claimed in claim 14, wherein the carriage (60) comprises two gripping heads (73) engaging respective runners (59); and a shaft (74) which rotates about its axis, and supports two further gripping heads (75) which grip the rods (62) to vary the effective length of the rods (62) between the carriage (60) and the inside ramp (13).

16. A lay ramp actuating method for an underwater-pipeline laying vessel, the actuating method comprising the step of selectively lifting and lowering a lay ramp (6; 46) with respect to the vessel (1; 41) by means of an actuating device (23; 58) comprising a runner (28; 59), and a carriage (29; 60) connected to the lay ramp (6; 46) and which runs along the runner (29; 59); the method being characterized by running the carriage (29; 60) along a first, a second, and a third portion (31, 32, 33; 63, 64, 65), of which the first and the third portion (31, 33; 63, 65) are out of line with respect to each other; and selectively aligning the second portion (32; 64) with the first and third portion (31, 33; 63, 65) by means of a movable assembly (37; 70).

17. The method as claimed in claim 16, including the step of rotating the movable assembly (37; 70) about an axis (A2) perpendicular to a common plane in which the first, second, and third portion (31, 32, 33; 63, 64, 65) lie.

18. The method as claimed in claim 17, including the step of rotating the movable assembly (37; 70) by means of a hydraulic actuator (39;: 72).

19. The method as claimed in claim 18 including the step of moving the carriage (29; 60) along the runner (28; 59) by means of hydraulic actuators on the carriage (29; 60).

20. The method as claimed in claim 19 wherein the first, second, and third portion (31, 32, 33; 63, 64, 65) are defined by a first, a second, and a third rail (34, 35, 36; 66, 67, 68) respectively.

21. The method as claimed in claim 20 further including the step of aligning the second portion with the first portion (32, 31; 64, 63); moving the carriage (29; 60) from the first portion to the second portion (31, 32; 63, 64); activating the movable assembly (37; 70) together with the carriage (29; 60) to align the second portion with the third portion (32, 33; 64, 65); and moving the carriage (29; 60) from the second portion to the third portion (32, 33; 64, 65).

22. The method as claimed in claim 20 further including the step of activating the movable assembly (37; 70) to align the second portion with the third portion (32, 33; 64, 65); moving the carriage (29; 60) from the third portion to the second portion (33, 32; 65, 64); activating the movable assembly (37; 70) together with the carriage (29; 60) to align the second portion with the first portion (32, 31; 64, 63); and moving the carriage (29; 60) from the second portion to the first portion (32, 31; 64, 63).

23. The method as claimed in claim 22 including the further step of determining the position of the carriage (29; 60) along the runner (28; 59) by means of sensors (40; 76) connected to a control unit (20; 56).

24. The method as claimed in claim 23 including the further step of determining the position of the second portion (32; 64) by means of sensors (40; 76) connected to a control unit (20; 56).

25. An underwater-pipeline laying vessel equipped with a lay ramp (6; 46); the vessel including (1; 41) an actuating device (23; 58) for lifting and lowering the lay ramp (6; 46), and a runner (28; 59), and a carriage (29; 60) connected to the lay ramp (6; 46) and which runs along the runner (28; 59) to lift and lower the lay ramp (6; 46); wherein the runner (28; 59) comprises a first, a second, and a third portion (31, 32, 33; 63, 64, 65), of which the first and third portion (31, 33; 63, 65) are out of line with respect to each other, and the second portion (32; 64) is mounted on a movable assembly (37; 70) to selectively align the second portion (32; 64) with the first and third portions (31, 33; 63, 65).

26. The vessel as claimed in claim 25, wherein the lay ramp (6; 46) comprises an inside ramp (13; 49) hinged to the vessel (1; 41); and an outside ramp (14; 50) hinged to the inside ramp (13; 49).

* * * * *

UNITED STATES PATENT AND TRADEMARK OFFICE
CERTIFICATE OF CORRECTION

Page 1 of 1

PATENT NO.         : 8,061,933 B2
APPLICATION NO.    : 12/451885
DATED              : November 22, 2011
INVENTOR(S)        : Giovanni Carlos Alloggio, Christian Cocca and Teresio Signaroldi It is certified that error appears in the above-identified patent and that said Letters Patent is hereby corrected as shown below:

Title Pg, Item (22)
The PCT filing date was erroneously indicated as "May 6, 2008" instead of the correct date "June 5, 2008."

Signed and Sealed this
Twenty-eighth Day of February, 2012

David J. Kappos
*Director of the United States Patent and Trademark Office*